United States Patent
Toso et al.

(10) Patent No.: US 11,123,704 B2
(45) Date of Patent: Sep. 21, 2021

(54) ANTIBODY-RESIN COUPLING APPARATUS AND METHODS

(71) Applicant: SHIRE HUMAN GENETIC THERAPIES, INC., Lexington, MA (US)

(72) Inventors: Robert Toso, Pleasant Hill, CA (US); Richard Spanggord, San Jose, CA (US); Mei Tan, San Mateo, CA (US); Van Tairiol, Placerville, CA (US); Yekaterina Lin, Santa Clara, CA (US)

(73) Assignee: TAKEDA PHARMACEUTICAL COMPANY LIMITED, Osaka (JP)

( * ) Notice: Subject to any disclaimer, the term of this patent is extended or adjusted under 35 U.S.C. 154(b) by 378 days.

(21) Appl. No.: 16/048,999

(22) Filed: Jul. 30, 2018

(65) Prior Publication Data

US 2019/0039042 A1 Feb. 7, 2019

Related U.S. Application Data

(60) Provisional application No. 62/541,601, filed on Aug. 4, 2017.

(51) Int. Cl.
*B01J 19/00* (2006.01)
*B01J 19/18* (2006.01)
(Continued)

(52) U.S. Cl.
CPC ............. *B01J 19/18* (2013.01); *B01D 29/01* (2013.01); *B01F 7/00583* (2013.01);
(Continued)

(58) Field of Classification Search
CPC .......... B01F 7/00583; B01F 2005/0037; B01F 2005/004; B01F 15/00785; B01J 19/18;
(Continued)

(56) References Cited

U.S. PATENT DOCUMENTS 4,153,403 A * 5/1979 Schneider ............. A47J 31/401
425/159
4,252,754 A 2/1981 Nakaguchi et al.
(Continued)

FOREIGN PATENT DOCUMENTS

CN 201735210 U 2/2011
CN 202778300 U 3/2013
(Continued)

OTHER PUBLICATIONS

International Search Report and Written Opinion dated Nov. 21, 2018, for PCT/US18/44324, filed Jul. 30, 2018 (11 pages).
(Continued)

*Primary Examiner* — Anshu Bhatia
(74) *Attorney, Agent, or Firm* — Troutman Pepper Hamilton Sande

(57) ABSTRACT

An antibody-resin coupling apparatus quickly and efficiently activates resin beads and couples them to antibodies, while preventing breakdown and crosslinking of the beads, thereby improving downstream column purification processes, extending the usable life of the resin beads, and increasing molecule capture efficiency of the resultant resin-antibody complexes, to allow improved isolation and purification of factor VIII molecules or other drug compounds.

14 Claims, 9 Drawing Sheets

(51) Int. Cl.
*B01J 8/00* (2006.01)
*B01D 29/01* (2006.01)
*B01F 7/00* (2006.01)
*B01F 15/00* (2006.01)
*B01F 15/02* (2006.01)

(52) U.S. Cl.
CPC .... *B01F 15/00785* (2013.01); *B01F 15/0203* (2013.01); *B01J 8/006* (2013.01); *B01J 19/0066* (2013.01); *B01J 2208/00805* (2013.01); *B01J 2208/00858* (2013.01)

(58) Field of Classification Search
CPC ............ B01J 8/006; B01J 2208/00805; B01J 2208/00858; B01D 29/01
See application file for complete search history.

(56) References Cited

U.S. PATENT DOCUMENTS

| | | | |
|---|---|---|---|
| 4,869,595 A * | 9/1989 | Lang | B01F 5/045 366/137 |
| 4,961,432 A | 10/1990 | Guirguis | |
| 5,024,237 A | 6/1991 | Guirguis | |
| 5,133,363 A | 7/1992 | Guirguis | |
| 5,200,270 A | 4/1993 | Ishida et al. | |
| 5,356,213 A * | 10/1994 | Arpentinier | F23L 7/007 366/165.1 |
| 5,358,690 A | 10/1994 | Guirguis | |
| 5,388,906 A | 2/1995 | Rao | |
| 5,686,315 A | 11/1997 | Pronovost et al. | |
| 6,197,526 B1 | 3/2001 | Yu et al. | |
| 7,022,775 B2 | 4/2006 | Siali et al. | |
| 7,905,653 B2 * | 3/2011 | Wilmer | B01F 5/061 366/132 |
| 9,340,627 B1 | 5/2016 | Kufeld et al. | |
| 2005/0118343 A1 | 6/2005 | Colombo et al. | |
| 2011/0204533 A1 | 8/2011 | Winchester et al. | |
| 2014/0056772 A1 | 2/2014 | Stimits et al. | |
| 2016/0340410 A1 | 11/2016 | Winge et al. | |

FOREIGN PATENT DOCUMENTS

| | | |
|---|---|---|
| CN | 105032225 A | 11/2015 |
| CN | 106914170 A | 7/2017 |
| WO | 2012/003490 A1 | 1/2012 |
| WO | 2015/080874 A1 | 6/2015 |
| WO | 2015/153192 A1 | 10/2015 |

OTHER PUBLICATIONS

Extended European Search Report issued with corresponding European Patent Application 18842194.5 dated Mar. 17, 2021.
First Office Action issued in corresponding Chinese Patent Application No. 2020107500935 dated Mar. 16, 2021.

* cited by examiner

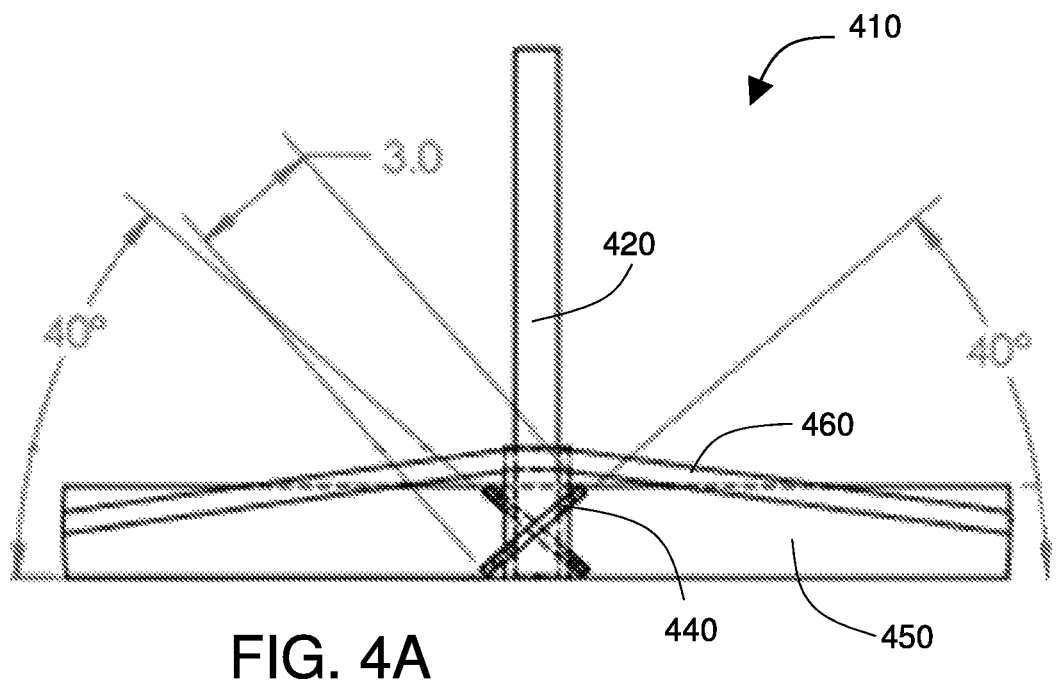
FIG. 4A
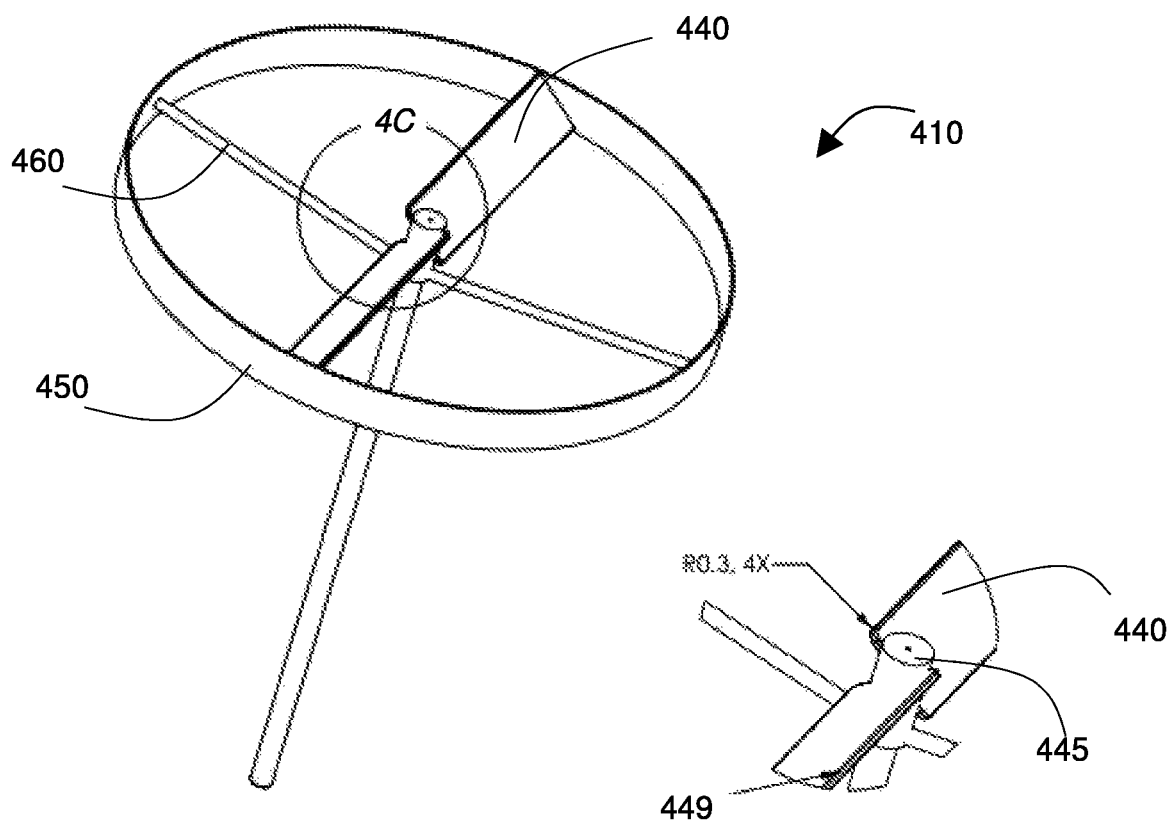
FIG. 4B
FIG. 4C

ANTIBODY-RESIN COUPLING APPARATUS AND METHODS

CROSS-REFERENCE TO RELATED APPLICATIONS

This application claims the benefit of, and priority to, U.S. Application No. 62/541,601 filed on Aug. 4, 2017, the contents of which are incorporated by reference.

FIELD OF THE INVENTION

The present disclosure relates to devices and methods for activating resins and coupling antibodies to the resin.

BACKGROUND

Hemophilia is an inherited bleeding disorder that prevents blood from clotting normally and is characterized by hemorrhages, which may occur spontaneously or after minor trauma. It is often associated with a deficiency of an essential blood-clotting protein, factor VIII, also known as antihemophilic factor (AHF). In humans, factor VIII is encoded by the F8 gene. Defects in this gene result in hemophilia A ("classic" hemophilia), a recessive X-linked coagulation disorder that results in prolonged plasma clotting time. Another type of hemophilia is acquired hemophilia A (AHA), which occurs in patients who have normal F8 genes but develop autoantibodies that inhibit factor VIII, creating a functional deficiency that impedes coagulation.

Providing intravenous factor VIII to patients with hemophilia can temporarily improve clotting. Many treatments for hemophilia such as the hemophilia treatments sold under the trademarks RECOMBINATE, ADVATE, ADYNOVATE, HEMOFIL, and OBIZUR, available from Shire Plc (Lexington, Mass.), involve recombinant factor VIII proteins synthesized and purified in the lab.

However, a major limiting factor in production of such treatments is the ability to isolate and purify the factor VIII molecules. One method is to use antibodies of factor VIII to capture the molecules in a column. Antibodies are coupled to a resin and loaded into a column, and media containing expressed factor VIII molecules is passed therethrough.

This purification process requires high precision to properly manipulate the resin. It can be extremely costly to perform, because the resin is expensive and can be easily damaged or wasted if not correctly processed. When the resin is not adequately coupled to the antibodies, cross-linking may occur between resin beads. Also the beads may break down if the resin is not carefully handled. Broken down or crosslinked resin beads can clog the column, creating excessive back pressure and causing the extraction process to fail. Accordingly, the difficulties with resin handling procedures and the limitations of resin-antibody coupling technology make the manufacturing process for hemophilia drugs expensive and complicated.

SUMMARY

The apparatus described herein efficiently activates resin beads and couples them to antibodies, while preventing breakdown and crosslinking of the beads, thereby improving downstream column purification processes, extending the usable life of the resin beads, and increasing molecule capture efficiency of the resultant resin-antibody complexes, to allow improved isolation and purification of a wide variety of biological compounds, including factor VIII molecules.

Although the apparatus is generally described herein with reference to its use in FVIII purification, it should be understood that the apparatus and related methods are useful for coupling antibodies of all types to porous resins. The inventions of the present disclosure can be applied to other affinity resins, particularly for other enzyme replacement therapy products or any other drug or biomolecule of interest. It is applicable to crosslinking chemistries between protein- or amine-containing ligands and a resin support. The resin may be agarose, glass, or other known porous resins of various densities. The antibodies used may be either polyclonal or monoclonal. Although the device is primarily described herein as being useful for coupling antibodies to resin, but the invention is compatible with any chemistry wherein hydroxyl groups are coupled to amino groups. It should be understood that the invention is useful with any known antibody that can be used for affinity chromatography purification of any biological compound, including peptides, nucleic acids, carbohydrates, and any ligand with amino groups.

The apparatus is generally a mixing device, which includes a vessel with inlets for introducing resin beads and various fluids, a dispersion tube for precise application of activation solution, a mesh screen for supporting the resin beads and allowing fluids to flow through, an agitator for mixing the beads as the fluids flow through, and outlets beneath the screen for draining fluids. Components of the apparatus can be made of stainless steel or other resilient material. In operation, resin beads in a buffer solution are poured into the vessel before being activated by dispersion of CNBr and acetonitrile via the dispersion tube. The beads are stirred using the agitator for a short period of time (approximately 3 minutes or less), before the fluid is drained through the outlet. The beads may be washed with water or other buffers before adding a coupling solution and monoclonal antibodies. The beads and antibodies are incubated with agitation for a set period of time, while the device maintains a low temperature and monitors pH of the solution. The antibody-coupled resin is captured on the screen and removed from the device for use. The device can be used for a variety of resin and antibody types. The system allows large volumes of resin to be activated quickly and evenly, without breaking the resin beads and avoiding cross-linkage between beads. This provides more effective resin-antibody coupling while controlling the chemistry to lengthen the usable life of the resin beads.

A key aspect of the device is the dispersion tube, which is optimized for dispersion of a CNBr activation solution to the resin. This allows even distribution of CNBr under a controlled time period and helps to achieve the addition of the activation solution quickly, preferably under about 3 minutes. These factors are important for the homogeneous coupling of the antibodies and resin because they reduce variation in the addition of solution to the resin/buffer mixture, which can transiently exceed the buffering capacity of the buffer. Such variability would result in undesired iso-urea cross-linkage that would hydrolyze and increase antibody leaching or potentially exchange with other nucleophiles to foul the resin or cause increased leaching. Controlling the timing of activation solution helps with downstream process control for antibody coupling, because it allows optimal resin activation followed by rapid addition of antibody prior to the loss of significant numbers of activated groups on the resin.

In certain aspects, the disclosure relates to a device for coupling antibodies to resin. The device includes a mixing vessel divided into an upper portion and a lower portion by a mesh screen stretched across the vessel, the upper portion having at least one inlet and the lower portion having at least one outlet, and the mesh screen having a pore size between 5 and 80 µm. The device further includes an agitator disposed within the upper portion and a dispersion apparatus above the agitator. The dispersion apparatus includes an elongated tubular structure forming a lumen. The tubular structure has a proximal portion extending vertically outside of the mixing vessel with an inlet that opens upward, a distal portion with a closed end and a plurality of downward-facing holes positioned horizontally within the upper portion, and an elbow connecting the distal portion and the proximal portion.

The agitator may include a rotor and a rotating impeller comprising a hub and at least two blades extending in opposite directions perpendicularly from the hub. Each blade has an axis approximately transverse to the axis of the rotor upon which the hub is configured to rotate. The agitator is configured to rotate to impart a force on a fluid in the vessel to provide lift and to keep the beads moving across the screen. The screen may also have a support beam configured to support the screen and prevent the screen from bowing. The screen may be configured to be removable from the vessel.

The agitator rotates at a speed sufficient to rapidly mix resin beads without breaking them. The agitator rotating speed may be between about 10 and 50 RPM, and in particular embodiments the speed is 20 or 35 RPM. In embodiments, the blades have a fixed pitch and rounded edges.

In related aspects, the disclosure relates to a dispersion tube apparatus that includes an elongated tubular structure forming a lumen with a circular cross-section. The tubular structure includes a proximal portion with an upward-facing inlet, a distal portion with a closed end and between 4 and 100—and preferably about 8 to 30—downward-facing holes arranged in two or more rows parallel to the axis of the distal portion. The rows are positioned between about 15 and about 60 degrees apart from each other on the distal portion. The tubular structure also includes an elbow between the distal portion and the proximal portion, which comprises a bend in the tubular structure to orient the inlet such that it opens in a direction that is substantially perpendicular to the axis of the distal portion.

In some embodiments, the distal portion of the dispersion apparatus has three parallel rows of downward-facing holes. In some embodiments, there are between 12 and 25 downward-facing holes, and in a preferred embodiment there are 21 holes, with rows of 10, 8, and 3 holes. In some embodiments, the rows have different numbers of holes, and in others they have the same number of holes. The rows of holes may be positioned between about 15 and 105 degrees apart. The bend in the elbow portion orients the distal portion and the proximal portion at between 60 and 120 degrees with respect to each other, and in some embodiments about 80-100 degrees, and in a preferred embodiment about 90 degrees. The tubular structure can be made of stainless steel. The dispersion apparatus may also include a valve for opening and closing the inlet and a funnel connectable to the inlet, for holding the dispersion fluid prior to use.

In a related aspect, the disclosure relates to methods for activating a resin. The method involves inserting resin beads, suspended in water into a mixing vessel, wherein the mixing vessel includes a dispersion apparatus, a mesh screen with holes smaller than the resin beads, and an agitator disposed above the mesh screen. The resin beads may comprise agarose, such as CL-4B or CL-2B beads or the agarose beads sold under the trademark CAPTO by GE Healthcare Life Sciences (Marlborough, Mass.). The method further includes dispersing an activation solution comprising CNBr and acetonitrile onto the resin beads via the dispersion apparatus and stirring the agitator for less than 5 minutes. The method then involves draining the activation solution through the mesh screen, thereby leaving activated resin beads supported on the screen.

In some embodiments, the method also involves washing the activated resin beads with a fluid. Washing may include filling the mixing vessel with the fluid, incubating while stirring the agitator, and draining the fluid from the mixing vessel. The fluid may be a buffer, water, or solution comprising sodium bicarbonate and sodium chloride. Stirring may be between 10 RPM and 40 RPM, and preferably about 20 RPM or 35 RPM. Incubating with stirring may last less than 4 minutes, and preferably less than 3 minutes.

BRIEF DESCRIPTION OF THE DRAWINGS

FIG. 1A shows a side cross-sectional view; FIG. 1B shows a top cross-sectional view; and FIG. 1C shows a front cross-sectional view.

FIG. 2A shows a side view of the dispersion tube. FIG. 2B show a side view of the dispersion tube with a particular configuration of holes. FIG. 2C shows a radial cross-section of the dispersion tube, showing the angle at which the holes are drilled. FIG. 2D shows a side view of the dispersion tube with the locations of a row of 8 holes. FIG. 2E shows a radial cross-section of the dispersion tube, showing the angle at which the holes of FIG. 2D are drilled. FIG. 2F shows a side view of the dispersion tube with the locations of row of 10 holes. FIG. 2G shows a radial cross-section of the dispersion tube, showing the angle at which the holes of FIG. 2F are drilled.

FIGS. 4A-C show views of the agitator. FIG. 4A is a side cross-sectional view of the agitator. FIG. 4B is an upside-down perspective view of the agitator and blades. FIG. 4C is a close-up view of the hub and blade of FIG. 4B.

DETAILED DESCRIPTION

Figure 1A:
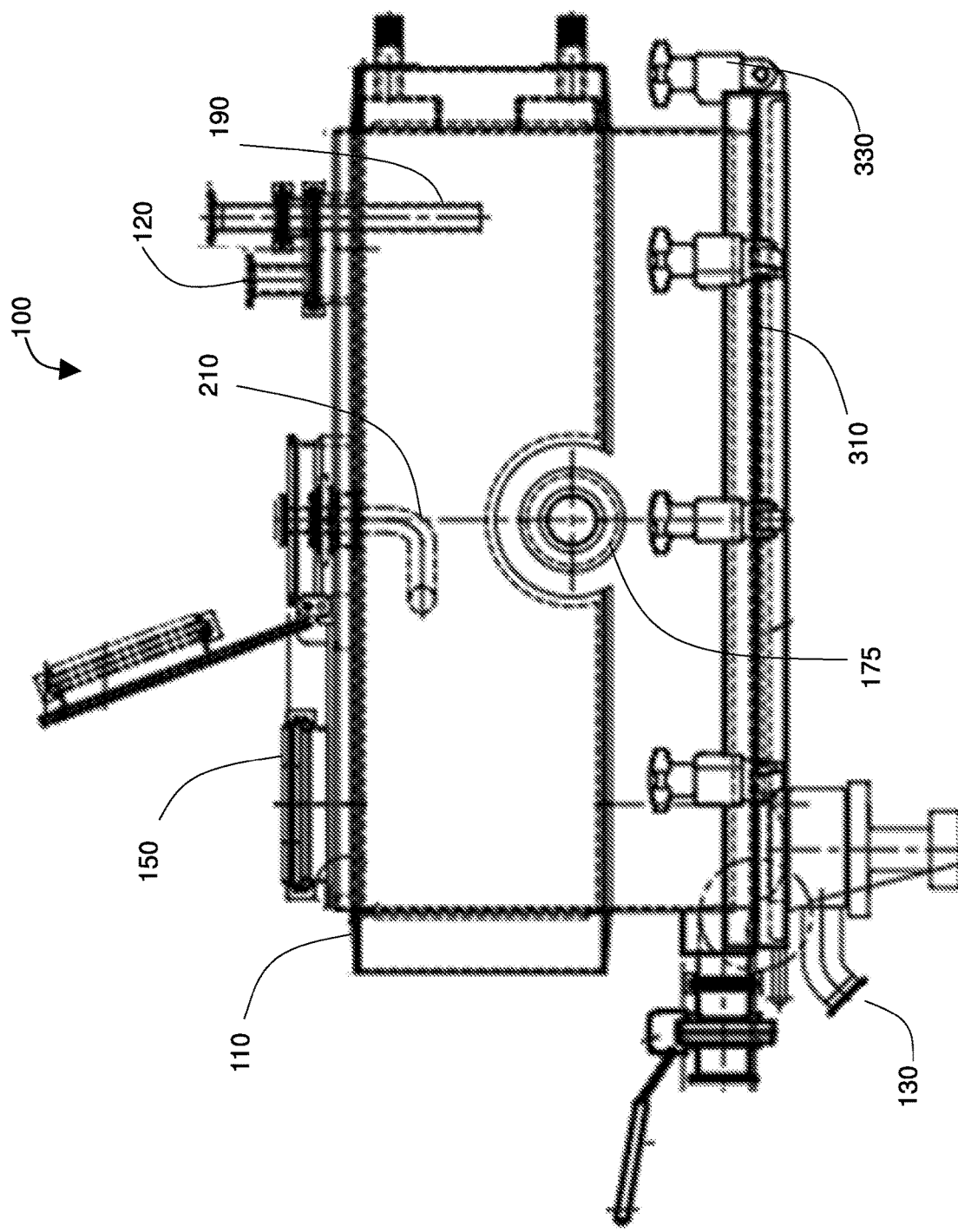
FIGS. 1A-C show views of the mixing vessel.

Devices for isolating and purifying molecules from culture media are integral to drug manufacturing. Many drugs involve recombinant proteins that are grown in culture and must then be purified and extracted from the media. Purification of these compounds requires precise control of reagents and materials, and specialized equipment. Due to the complexity of preparing and using these materials, devices are necessary for generating purification matrices for extracting the drugs in a more efficient, accurate, and cost-effective way. Such devices improve availability of recombinant proteins, which are needed to treat a variety of diseases.

Many drugs involve recombinant proteins that deliver a desired biochemical response when introduced to a patient. For example, hemophilia drugs such as RECOMBINATE™ and ADVATE® are intravenously injectable factor VIII molecules, which improve blood clotting in patients with hemophilia to control and prevent bleeding episodes. Treatment with these drugs normalizes clotting time over the effective dosing period by increasing plasma levels of factor VIII to temporarily correct the coagulation defect in those patients. Factor VIII replacement drugs can be used for routine prevention and reduction of bleeding, or they can be administered before, during, and after surgery to manage blood clotting. The goal of such treatments is to maintain a plasma factor VIII activity level at or above desired levels. For example, for minor bleeding episodes such as early hemarthrosis, mild muscle bleeding, or mild oral bleeding episodes, it may be desirable to administer a dose to achieve about 20-40% of normal factor VIII level. For moderate bleeding, such as muscle bleeding, bleeding into the oral cavity, definite hemarthrosis, and known trauma, 30-60% of normal factor VIII activity may be required. To treat major bleeding, such as significant gastrointestinal bleeding, intracranial, intra-abdominal or intrathoracic bleeding, central nervous system bleeding, bleeding in the retropharyngeal or retroperitoneal spaces or iliopsoas sheath, fractures, or head trauma, 60-100% factor VIII level may be required.

RECOMBINATE™, ADVATE®, ADYNOVATE®, HEMOFIL®, and OBIZUR® are examples of recombinant factor VIII molecules that can be used to temporarily replace the patient's missing factor VIII to achieve hemostasis. ADVATE®, for example, is a purified glycoprotein consisting of 2,332 amino acids synthesized by a genetically engineered Chinese hamster ovary cell line. ADYNOVATE® is the purified ADVATE® molecule which has been covalently conjugated with one or more molecules of polyethylene glycol, which reduces binding to the physiological factor VIII clearance receptor (LRP1) and exhibits an extended terminal half-life. OBIZUR® is a recombinant analogue of porcine factor VIII. The B-domain present in naturally occurring porcine factor VIII is replaced with a twenty-four amino acid linker. Once activated, the resulting drug has a comparable activity to the endogenous human factor VIII.

To manufacture these drugs—and other drugs that involve recombinant proteins—the molecules must be purified from culture media. Generally, the recombinant cell lines express the factor VIII protein and secrete it into the cell culture medium. The molecule is then purified from the culture medium. The purification process may involve introducing the medium to one or more immunoaffinity chromatography columns in which a purification matrix, prepared by immobilization of a monoclonal antibody to a resin, selectively isolates the factor VIII. The method may also involve one or more filtration steps. HEMOFIL®, for example, is a factor VIII protein isolated from pooled human plasma by immunoaffinity chromatography using a mouse monoclonal antibody to factor VIII, followed by an ion exchange chromatography step for further purification.

Monoclonal antibodies are particularly useful for capturing factor VIII and other target molecules. The purification matrix that selectively purifies the target molecule is made by coupling antibodies to a resin. Preparing the resin and coupling the antibodies is difficult because slight changes in the chemistry affect the bonding process and the resultant purification matrix. Devices disclosed herein provide improved bonding of antibodies to resin beads. The chemistry of the resin coupling process is controlled to generate antibody-resin complexes with greater efficacy and longevity. With proper manufacturing and handling, the resin can last for several years and be reused hundreds of times before needing to be replaced. Because resin beads may cost tens of thousands of dollars per liter, it is important for manufacturers to have a reliable process for producing long-lasting antibody-resin complexes without needlessly wasting quantities of the resin.

As stated above, small aberrations in the chemistry can reduce the function of the resin product. The resin must be prepared quickly and precisely to achieve a homogenous product on a large scale. The disclosed devices allow a rapid homogenous reaction that is repeatable and yields a standardized product. Without such devices, the resulting resin product would have micro-heterogeneities that create leaching issues in the resin. If the resin is not homogenously activated, the beads may become cross-linked to each other, creating clumps in the resin. Clumping and heterogeneity in the resin leads to packing problems in the downstream purification protocols. For example, resin that clumps together may be less permeable to fluids passing therethrough, and cause a buildup of pressure in the column. Heterogeneous resin may lead to inefficient capture of the target molecule or it may simply be unusable and need to be discarded.

The disclosed devices also prevent excess breakage of the beads during the processing steps. If more than about 2 percent of beads are broken, the resulting resin would be too dense and would over-compress when loaded into the column. Broken beads therefore cause back pressure in the column. If too much of the resin is broken during manufacture, part or all of the resin would need to be discarded, leading to excessive waste and expense. The devices disclosed herein avoid that problem and others. The devices optimize the resin preparation to ensure proper packing of resin in the column downstream.

In addition to improved column fluid dynamics, there are additional benefits to coupling resin using the disclosed apparatus. The apparatus allows greater reproducibility of resin than prior art devices. The resulting resin is more uniform in terms of ligand density, bead cross-linking, and bead integrity. This provides greater stability, reduction of variation in the manufacturing process, and greater yield. The result is a product with a longer usable life, which can be used for a greater number of production cycles without antibody/ligand leaching and loss of binding capacity. This reduces the cost of production of the enzyme or other biologic product.

The devices can be used for many types of coupling chemistry. For antibodies, the coupling is often amine-based. Antibodies may have 20-30 amino groups and another 20-30 carboxyl groups. The coupling technology disclosed herein can be used for any antibody or even smaller molecule coupling. In some embodiments monoclonal antibodies are coupled, and in other embodiments polyclonal antibodies are coupled to resin. The technology may be used to couple peptides as well. In any event, the goal of the technology is to achieve homogenous coupling of a molecule (antibody, peptide, or other) to resin beads. Homogenously linking the molecules to resin gives the resultant product predictable leaching behaviors and longer usability.

The coupling device shown in the accompanying figures quickly and effectively activates the resin and couples antibodies, to reduce waste, improve coupling efficiency and drug recovery. As described above, the device generally includes a mixing vessel, a dispersion tube, and an agitator and screen.

Figure 1B:
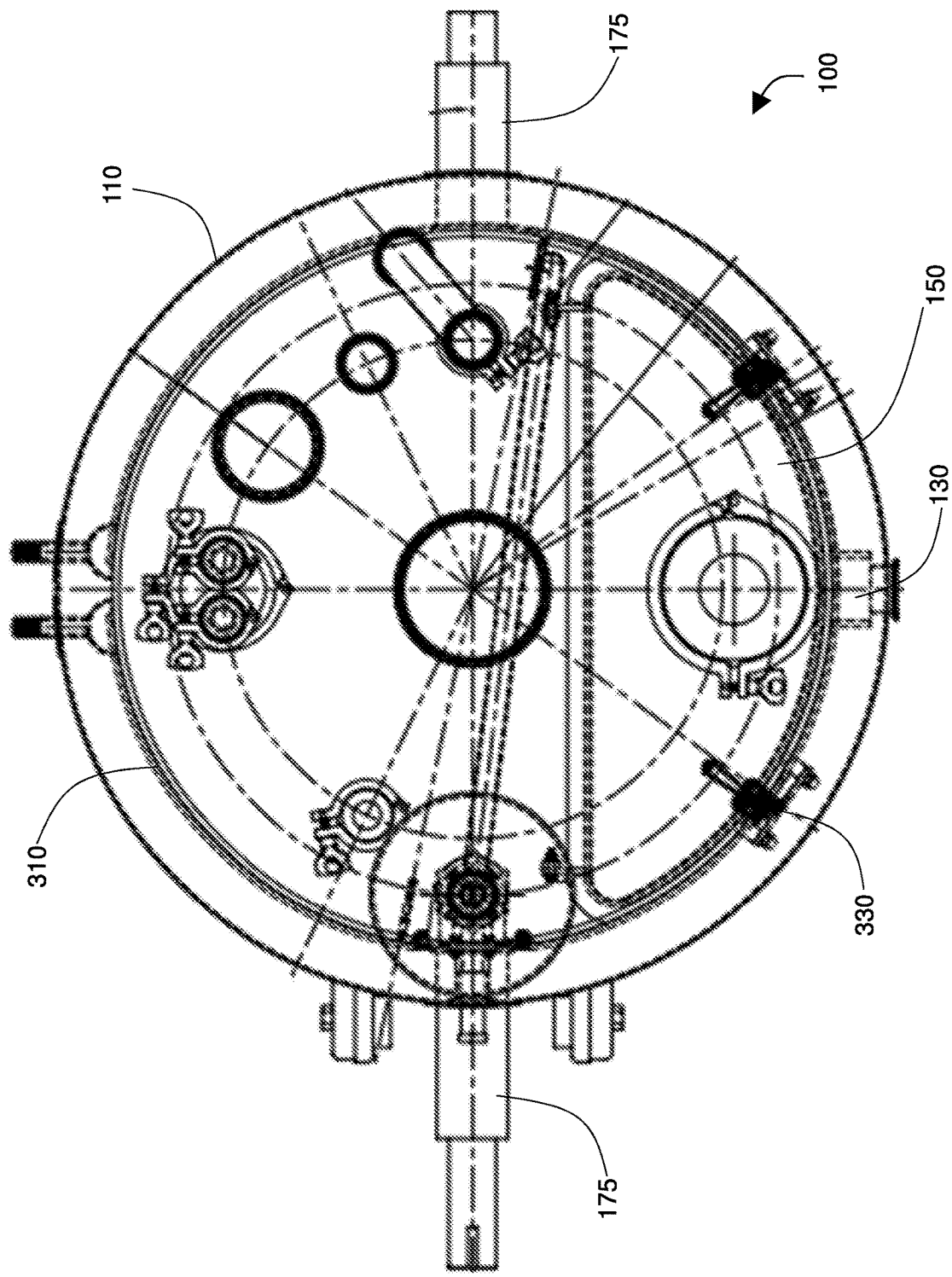
Figure 1C:
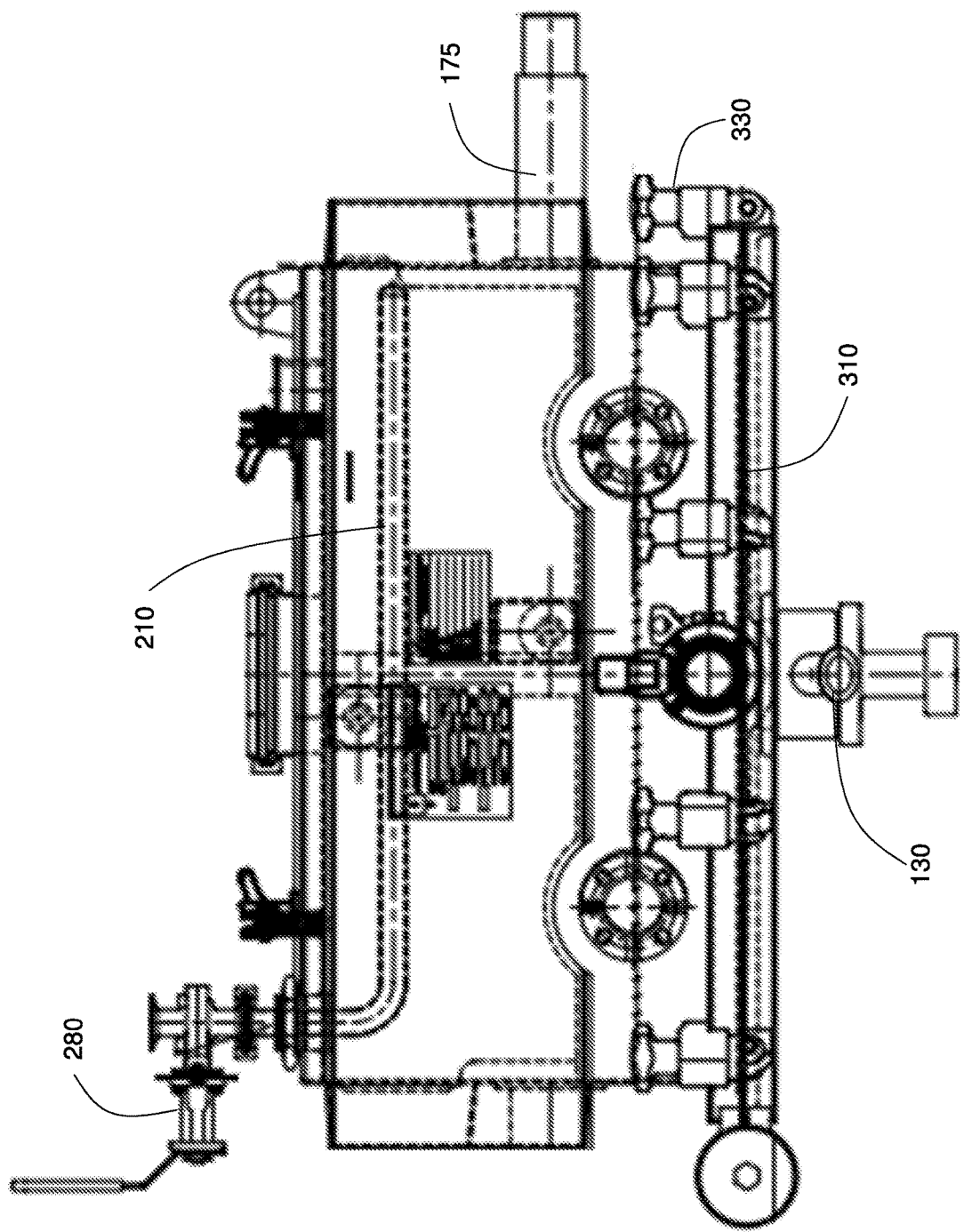

FIGS. 1A-C show the coupling apparatus 100. FIG. 1A shows a side cross-sectional view; FIG. 1B shows a top cross-sectional view; and FIG. 1C shows a front cross-sectional view. The apparatus 100 includes a mixing vessel 110, which houses the other elements described below and serves as mixing container for the various mixing steps. The vessel 110 has multiple inlets 120 and outlets 130. There is a hinged hatch 150 at the top of the vessel 110 where the resin beads may be inserted. The resin beads may be agarose beads, such as CAPTO™, CL-4B, or CL-2B beads, available from GE Healthcare Life Sciences (Marlborough, Mass.) and are generally inserted into the vessel 110 in a water suspension. Up to 50 liters of resin beads—and commonly about 22-39 liters—can be activated at a time in the vessel 110. Once inside the vessel 110, the beads are supported by a screen 310, which is made of a mesh material with holes of approximately 10-80 μm, which are small enough to prevent the resin beads from going into the lower portion of the vessel 110 in a preferred embodiment, the holes are about 30 μm. During the activation and coupling process, the beads are mixed by an agitator 410 (shown in FIGS. 4A-C), which prevents the beads from settling on the screen and helps to maintain homogeneity.

The vessel contains a dispersion tube 210, which is described in greater detail in FIGS. 2A-G, through which an activation solution of CNBr and acetonitrile is added to the beads. The dispersion tube 210 is designed to evenly distribute the activation solution over the beads while the agitator 410 keeps them moving to prevent resin clumping. As described below, the agitator 410 rotates at a speed that is sufficient to provide lift to the beads and to keep them moving, but gentle enough to prevent breakage of the beads. After activation, the activation solution can be drained through the drainage spout 130, leaving the activated beads on the screen 310.

Various fluids and buffers can be inserted into the vessel 110 via the dispersion tube 210, the inlet 120, or the hatch 150, as desired. Different solutions are required for the activation process, washing process, and coupling process. An exemplary resin coupling process begins with resin being poured into the vessel 110 through the hatch 150. The resin includes resin beads in a water suspension. An activation solution of CNBr and acetonitrile is dispersed onto the resin through the dispersion tube 210 while the agitator 410 mixes the resin, keeping the beads moving above the screen 310. A small amount of acetonitrile may be used to chase the activation solution in the dispersion tube. The beads may be washed with the activation solution for up to 5 minutes to activate the resin. Preferably, the activation takes place in less than 3 minutes.

Various buffers and coupling solutions may be added, along with antibodies suspended in a coupling solution to couple them to the beads. With all washing and coupling steps, as during activation, the agitator rotates to maintain constant movement of the beads, preventing them from sticking to the screen, and to evenly distribute the various fluids and buffers and to ensure that all surfaces of the beads are contacted. Washing steps and other mixing steps may be continuous, with fluid continuously flowing into the inlets and out of the outlets, or the vessel may be filled and mixing can occur for a set period of time, from several seconds, to minutes, or even multiple hours. The vessel 110 also contains temperature controls so that the contents can be incubated at a desired temperature during mixing. The apparatus 100 may also include one or more probes 190, such as a temperature gauge and/or a pH probe to monitor the conditions inside the vessel during operation.

The screen 310 is designed to be removable and is held in place by a series of clamps 330. The vessel 110 also includes trunnions 175 so that the apparatus can be mounted on a pivot. This allows the apparatus to be tilted so that a user can fill the vessel or pour liquids out of it as needed. The tilting function allows the processed resin to be poured out of the hatch rather than scooped manually, which prevents additional stress on the beads and the screen. The trunnions 175 can be locked in place during use so that it remains stationary while mixing. It is important for the screen 310 and agitator 410 to remain substantially horizontal during mixing to achieve proper movement of the beads in the vessel and to ensure the beads are evenly exposed to the various fluid mixtures.

Figure 2A:
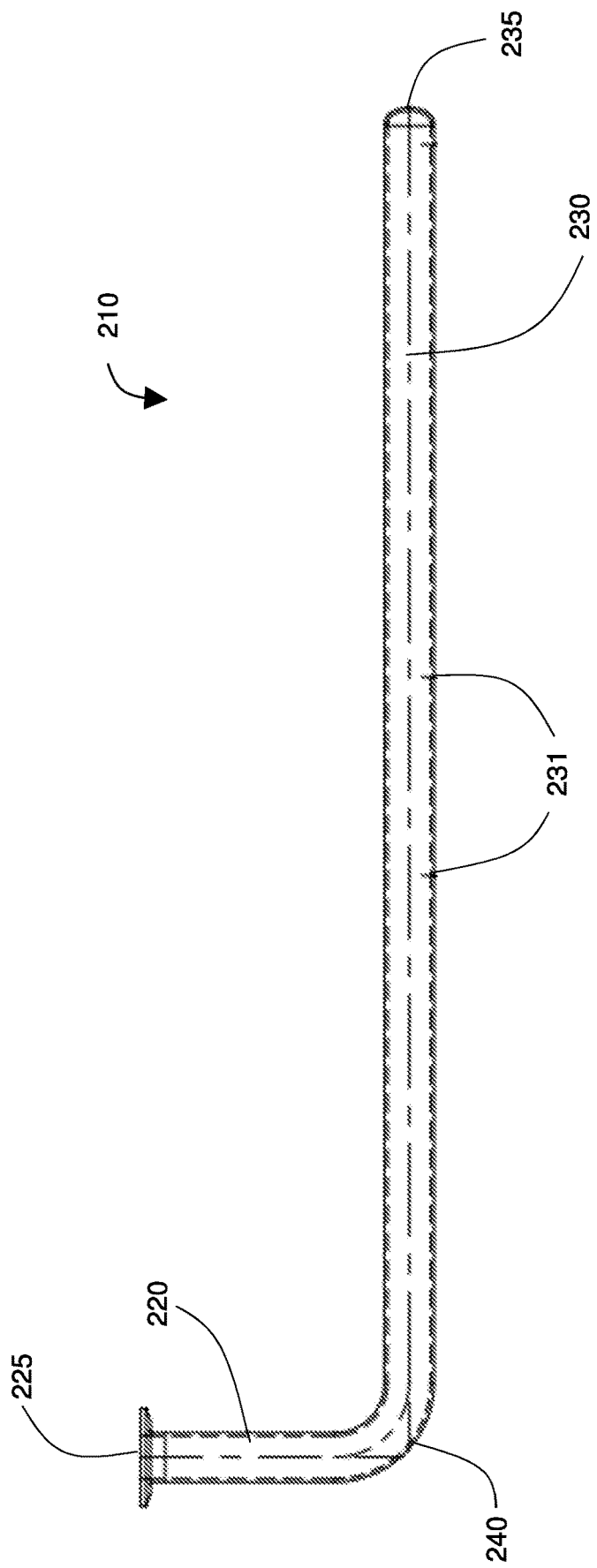
FIGS. 2A-G show the dispersion tube and a preferred arrangement of holes for the dispersion tube.

FIGS. 2A-G show the dispersion tube 210. As shown in FIG. 2A, the dispersion tube 210 is generally a hollow pipe with a long horizontal portion 230, a vertical portion 220, and an elbow 240. The horizontal portion 230 is generally a length of metal tubing punctuated with holes at regular or semi-regular intervals. The length of the horizontal portion 230 stretches across the vessel. In the embodiment shown, the dispersion tube 210 has a plurality of holes 231, whose positions are marked (in FIGS. 2B, 2D, and 2F) by their distance down the length of the tube 210. The holes 231 allow a CNBr activation mixture to flow through. Together, they provide a reproducible homogeneous distribution of the activation mixture onto the resin below. The dispersion tube 210, particularly in combination with the agitator 410, prevents inconsistency in the distribution of CNBr and avoids localized pH spikes that can lead to incorrect coupling chemistry and increased ligand leaching.

The vertical portion 220 of the dispersion tube 210 is configured to extend out of the vessel 110 while the horizontal portion 230 is positioned within the vessel 110 above the agitator 410 and screen 310. The vertical portion 220 includes an inlet 225, through which the CNBr can be flowed and introduced into the mixing vessel 110. The horizontal portion 230 has a closed end 235 and a plurality of holes 231. Although one possible arrangement of holes is shown in FIGS. 2B-G, other similar arrangements of holes are contemplated as well. The holes should be distributed along the horizontal portion of the dispersion tube to achieve sufficient coverage of the resin that is being mixed below.

Figure 2C:
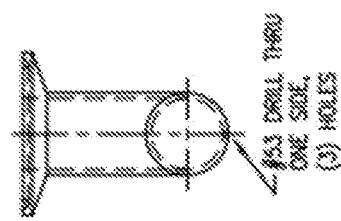
Figure 2B:
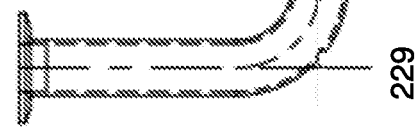

FIGS. 2B-C show the locations of three holes drilled along the bottom edge of the horizontal portion 230. FIG. 2B shows a radial cross-section of the dispersion tube. As depicted, the holes are located at 11.75 inches, 15.75 inches, and 26.50 inches measured from the axis 229 of the vertical portion 220. FIG. 2C shows a transverse cross-section of the horizontal portion. As shown in FIG. 2C, the holes are drilled through the bottom point in the horizontal portion.

Figure 2E:
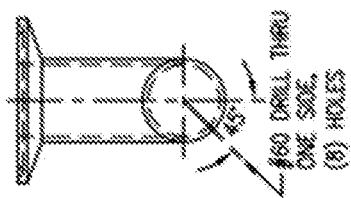
Figure 2D:
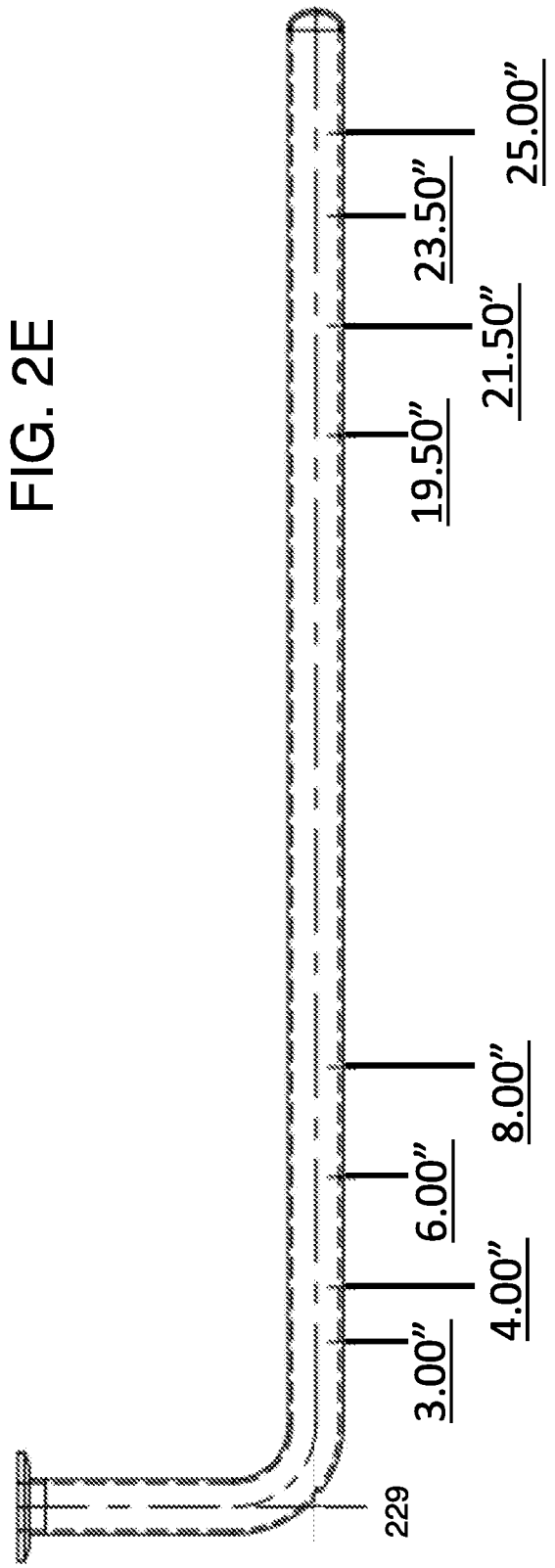

FIGS. 2D-E show the locations of eight holes drilled at a 45 degree angle from the bottom edge of the horizontal portion 230. FIG. 2D shows a radial cross-section of the dispersion tube, showing the measurements of the holes from the axis 229 of the vertical portion 220. As depicted, the holes are located at 3.00 inches, 4.00 inches, 6.00 inches, 8.00 inches, 19.50 inches, 21.50 inches, 23.50 inches, and 25.00 inches. FIG. 2E shows a transverse cross-section of the horizontal portion, indicating the angle at which this set of holes is drilled.

Figure 2G:
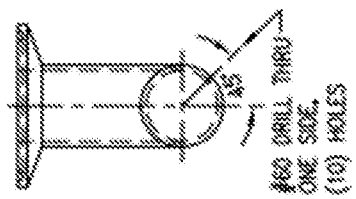
Figure 2F:
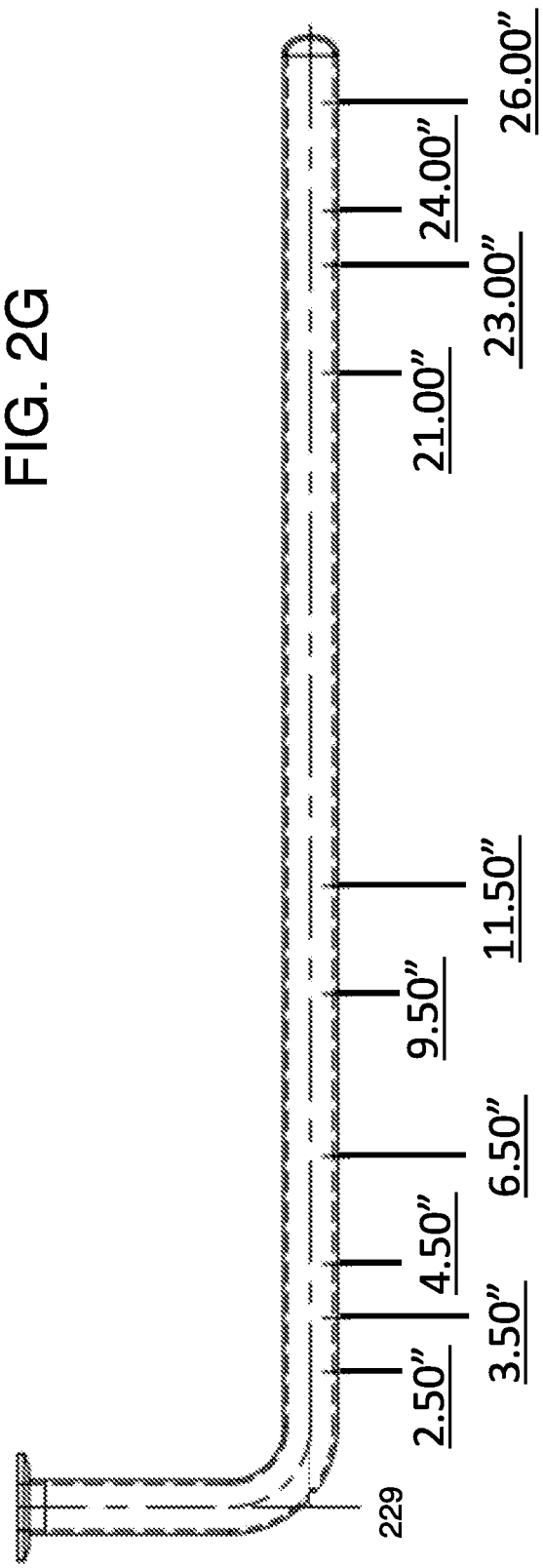

FIGS. 2F-G show the locations of another ten holes drilled at a 45 degree angle, on the other side of the dispersion tube 210 from the set of eight holes (shown in FIG. 2D). FIG. 2F shows a radial cross-section of the dispersion tube, showing the measurements of the holes from the axis 229 of the vertical portion 220. As depicted, the holes are located at 2.50 inches, 3.50 inches, 4.50 inches, 6.50 inches, 9.50 inches, 11.50 inches, 21.00 inches, 23.00 inches, 24.00 inches, and 26.00 inches. FIG. 2G shows a transverse cross-section of the horizontal portion, indicating the angle at which this set of holes is drilled.

As depicted in FIGS. 2B-G, the sets of holes are arranged in three parallel rows drilled into the bottom half of the horizontal portion 230. Each of the three rows has a different number of holes 231, and each hole is drilled at a distance along the horizontal portion 230 that is different from the distance of all other holes. The location of the holes is an important consideration for ensuring even distribution of the activation solution onto the resin. This arrangement of holes was found to be optimal based on salt modeling experiments. However, other arrangements of holes may also be used as well. The precise number of holes, their relation to each other, the number of rows, the angle at which the holes are drilled, the size of the holes, and other factors can be adjusted as needed.

Adding the activation mixture using the dispersion tube is superior to manual addition because it achieves greater uniformity in the resultant resin product. As explained above, resin manufactured by the disclosed coupling apparatus functions differently in the column as compared with resin generated using other methods. Using the dispersion tube can add a hundred or more cycles to the usable life of the resin beads.

Another important benefit of the dispersion tube is that it allows homogenous distribution of the activation mixture in a very short period of time. Activation of the resin with CNBr needs to occur quickly in order to reduce the occurrence of cross-links. In most cases it should be completed in less than 5 minutes, and ideally it should be completed in less than about 3 minutes. If the activation process takes significantly longer than 3 minutes, coupling efficiency is reduced resulting in excessive cross-linkage. The dispersion tube, particularly in conjunction with the agitator system described below, allows the activation process to occur quickly in order to produce a high quality resin. The CNBr can be added to up to about 40 liters of resin, mixed, and removed in under 3 minutes, and in some cases under 2 minutes.

Figure 3:
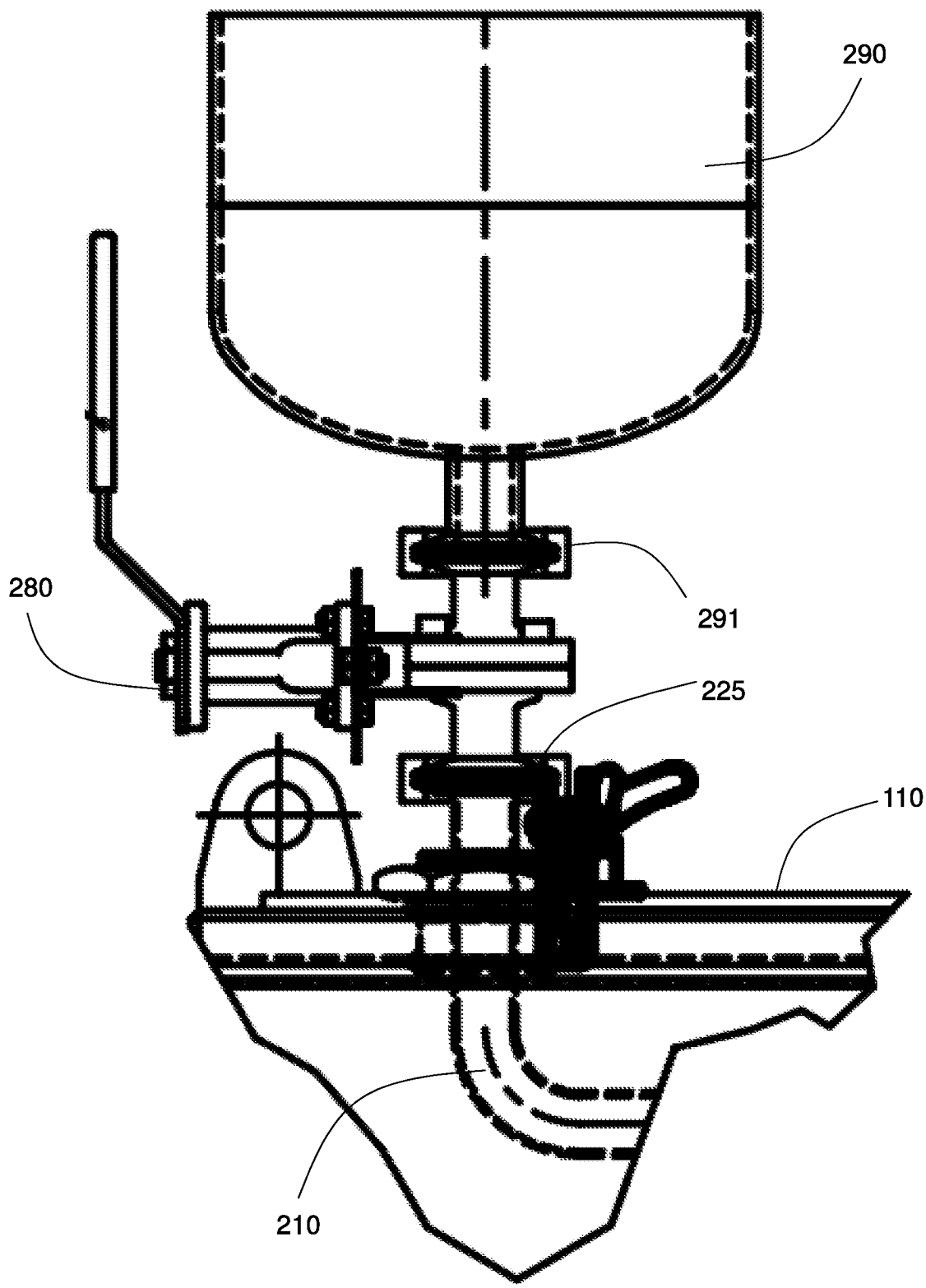
FIG. 3 shows the detachable holding vessel or funnel for the activation solution, and a valve connecting the funnel to the dispersion tube.

FIG. 3 shows a detachable holding vessel or funnel 290 for the CNBr-acetonitrile solution, which can be included in the apparatus. The outlet 291 of the funnel 290 is in fluid communication with the inlet 225 on the vertical portion 220 of the dispersion tube. A valve 280 controls flow of the fluid from the funnel 290 into the dispersion tube 210. In use, the detachable holding vessel 290 is filled with the CNBr solution and attached to the dispersion tube. The removability of the funnel 290 allows the CNBr to be more safely handled and avoid spillage. CNBr-acetonitrile mixture is corrosive and dangerous, and so the removable funnel allows the mixture to be mixed under a hood before being connected to the coupling apparatus.

Once the resin is prepared for activation, the valve 280 is opened to allow the solution to travel through the dispersion tube 210 and onto the resin. The dispersion typically takes 2-4 minutes. The solution can be chased with a small volume of acetonitrile solution to rinse remaining CNBr out of the funnel 290 and tube 210.

Inside the vessel 110, the resin beads are stirred by the agitator 410, which keeps them moving across the screen 310. A side cross-sectional view of the agitator is shown in FIG. 4A. The agitator includes a rotor 420, which is a vertical rod attached to a stirring motor (not shown). The agitator also includes blades 440 attached to the rod at a hub 445. In FIG. 4A, the blades 440 are shown in cross-section. An upside-down perspective view of the agitator is shown in FIG. 4B to provide a clearer view of the blade 440 configuration. The blades 440 rotate to lift the resin beads off of the screen 310. The agitator may also include a circular frame 450 that circumscribes the outermost points of the blades 440, and it may further include spokes 460 for additional support. Referring again to FIG. 4A, the bottom edge of the frame 450 is configured to be parallel with the screen (not shown), which is disposed beneath the agitator 410.

The blades 440 shown in FIG. 4A have a width of 3.0 inches, a thickness of 0.25 inches, and a length of 28.0 inches. However, the dimensions of the blades 440 may be different for different uses. In some embodiments the agitator 410 may include more than two blades. As shown, each blade 440 has a pitch of 40 degrees with respect to the horizontal. In different embodiments, the blades may have different pitch angles, such as 10 degrees, 20 degrees, 30 degrees, 50 degrees, 60 degrees, 70 degrees, 80 degrees, and the like. The blades 440 can have rounded edges 449 as shown in FIG. 4C, which helps to prevent bead breakage. The agitator may be made of stainless steel or another resilient material. In the embodiment shown in FIGS. 4A-C, the agitator is configured to rotate clockwise so that the blades create an upward lift in the fluid in the vessel (rather than pushing the fluid downward into the screen).

The rotational speed of the agitator can be adjusted based on the type of resin beads that are being used and the amount of mixing needed. The agitator must provide enough lift to keep the beads suspended and moving across the screen, and to rapidly mix them while avoiding breaking or crushing the beads. Since different beads settle at different rates, the agitator speed should be adjustable to account for different types of beads. For example, CAPTO™ beads settle faster than CL-4B or CL-2B beads. In various embodiments the agitator may rotate at up to 60 RPM. A preferred agitation speed is 35 RPM. Another preferred agitation speed is 20 RPM. The speed may be determined based on the type of bead, the type of liquid, the temperature of liquid, and the length of incubation time. Based on these factors, the agitator is designed to mix the resin thoroughly during the resin activation process and during the antibody coupling process. This allows correct mixing for chemical dispersion and avoids resin bead crushing/breaking during the coupling process. The agitator also increases the resin recovery rate because it prevents the resin from sticking to the screen.

In some embodiments, the two blades 440 of the agitator may be angled in opposite directions to provide for a dynamic resin agitation and suspension within the solution inside the vessel. In other words, one blade is angled downward causing the resin to be patted down onto the screen, while the other is angled upward to create lift. In other embodiments, the agitator blades are both angled the same direction. The agitator is configured to create a flow pattern that causes adequate mixing and suspension of the resin slurry when the agitator is rotated.

In the resin activation process, while the beads are moving, the dispersion tube 210 described above can be used to distribute activation mixture onto the beads. According to various methods, buffers and other fluids can be pumped through the vessel during the activation, washing, and coupling process. The fluids pass through the screen and drain out through an outlet at the bottom of the vessel, while the agitator 410 keeps the beads moving above the screen.

The screen shown in FIGS. 1A-C has a 30 inch diameter with a mesh pore size of 30 μm to retain the resin and allow the different solutions and buffers to be filtered through the mesh during the coupling process. The mesh may have a pore size as small as about 5 μm and as up to a maximum of about 80 μm. In any case the pore size should be small enough that beads cannot get through the screen. The screen may be a single mesh screen, or it may be two, three, or more sintered layers. Topmesh TM3-BM 30 is a mesh that is compatible with the present invention, supplied by G. BOPP USA, INC. (Wappingers Falls, N.Y.).

In an embodiment, the top layer is a 30 μm filtration mesh, sintered with a 0.850 mm square mesh and a 2.0 mm square mesh for support. The screen is welded to a stainless steel 30 inch frame. The screen may be held in place within the vessel by a gasket, which may be removable from the screen.

As discussed above, the agitator is designed to sufficiently mix the resin while preventing the resin from breaking down, which would clog the screen and prevent efficient resin recovery. The screen is removable however, so that it can be cleaned or replaced after normal wear and tear. The coupling activation process requires rapid buffer exchanges, on the order of minutes, where clogging of the screen will lead to slower buffer exchange rates, thus causing process non conformances and potential rejection of the lot.

The screen is resilient and resistant to tearing or breaking, to prevent resin from escaping through the screen. In addition, the screen structure is strong enough to not bow or bend under the weight of the resin. Bowing would lead to non-homogenous mixing or poor buffer flow through the apparatus and may cause clogging of the mesh. Bowing could also block the release valve 130 for the vessel 110 which is located a short distance beneath the level of the screen. In some embodiments a perforated support plate may be positioned between the layers for added rigidity and durability. Additionally or alternatively the screen may include a stainless steel support beam positioned underneath the screen to support the center. Inclusion of support structures helps to prevent heterogeneity in the distribution of the beads across the screen. Uneven distribution would lead to resin clumping and changes in the chemistry and the leaching properties of the resin.

INCORPORATION BY REFERENCE

Any and all references and citations to other documents, such as patents, patent applications, patent publications, journals, books, papers, and web contents, which have been made throughout this disclosure, are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein.

What is claimed is:

1. A dispersion apparatus comprising:
an elongated tubular structure forming a lumen having a circular cross-section, the tubular structure comprising: (a) a proximal portion with an upward-facing inlet; (b) a distal portion with a closed end, the distal portion comprising a plurality of downward-facing holes arranged in three rows parallel to the axis of the distal portion, wherein the three rows are positioned between about 15 and about 60 degrees apart from each other on the distal portion, and wherein all holes of the distal portion are positioned facing a mesh screen placed below the elongated tubular structure; and (c) an elbow between the distal portion and the proximal portion, the elbow comprising a bend in the tubular structure which orients the inlet such that it opens in a direction that is substantially perpendicular from the axis of the distal portion.

2. The dispersion apparatus of claim 1, wherein the distal portion comprises between 8 and 30 downward-facing holes.

3. The dispersion apparatus of claim 2, wherein the distal portion comprises exactly 21 downward-facing holes.

4. The dispersion apparatus of claim 3, wherein a first of the three rows has 10 holes, a second of the three rows has 8 holes, and a third of the three rows has 3 holes.

5. The dispersion apparatus of claim 1, wherein the three rows have different numbers of holes.

6. The dispersion apparatus of claim 1, wherein the three rows have the same number of holes.

7. The dispersion apparatus of claim 1, wherein the three rows are each positioned between 30 and 60 degrees apart.

8. The dispersion apparatus of claim 7, wherein the three rows are each positioned 45 degrees apart.

9. The dispersion apparatus of claim 1, wherein the bend in the elbow orients the distal portion and the proximal portion at between 60 and 120 degrees with respect to each other.

10. The dispersion apparatus of claim 9, wherein the bend in the elbow orients the distal portion and the proximal portion at between 80 and 100 degrees with respect to each other.

11. The dispersion apparatus of claim 10, wherein the bend in the elbow orients the distal portion and the proximal portion exactly 90 degrees with respect to each other.

12. The dispersion apparatus of claim 1, wherein the tubular structure comprises stainless steel.

13. The dispersion apparatus of claim 1, further comprising a valve for opening and closing the inlet.

14. The dispersion apparatus of claim 1, further comprising a funnel connectable to the inlet.

* * * * *

UNITED STATES PATENT AND TRADEMARK OFFICE
CERTIFICATE OF CORRECTION

| | | |
|---|---|---|
| PATENT NO. | : 11,123,704 B2 | |
| APPLICATION NO. | : 16/048999 | |
| DATED | : September 21, 2021 | |
| INVENTOR(S) | : Robert Toso et al. | |

It is certified that error appears in the above-identified patent and that said Letters Patent is hereby corrected as shown below:

On the Title Page

At item (72) for inventor names:
Please replace "Van Tairiol" with "Van Taiariol"

Signed and Sealed this
Thirtieth Day of August, 2022

Katherine Kelly Vidal
*Director of the United States Patent and Trademark Office*